United States Patent
Barker et al.

[11] Patent Number: 5,865,422
[45] Date of Patent: Feb. 2, 1999

[54] BI-DIRECTIONAL VALVE SEAL MECHANISM

[75] Inventors: James Edward Barker, Sauk Rapids; Steven Kenneth Neu, Paynesville; LaVern Allen Lawrence, Sauk Rapids, all of Minn.

[73] Assignee: General Signal Corporation, Stamford, Conn.

[21] Appl. No.: 994,122

[22] Filed: Dec. 19, 1997

Related U.S. Application Data

[63] Continuation-in-part of Ser. No. 634,198, Apr. 18, 1996, abandoned.

[51] Int. Cl.⁶ .................................................. F16K 1/22
[52] U.S. Cl. .................................... 251/173; 251/306
[58] Field of Search ................................. 251/305, 306, 251/173

[56] References Cited

U.S. PATENT DOCUMENTS

| | | |
|---|---|---|
| 4,037,819 | 7/1977 | Kindersley . |
| 4,058,290 | 11/1977 | Nelimarkka . |
| 4,254,937 | 3/1981 | Hubertson . |
| 4,265,426 | 5/1981 | Thurston et al. . |
| 4,281,817 | 8/1981 | Adams et al. . |
| 4,293,116 | 10/1981 | Hinrichs . |
| 4,410,163 | 10/1983 | Scobie et al. . |
| 4,477,057 | 10/1984 | Friess . |
| 4,513,946 | 4/1985 | Priese . |
| 4,744,572 | 5/1988 | Sahba et al. . |
| 4,796,857 | 1/1989 | Hayes et al. . |
| 4,901,979 | 2/1990 | Garrigues et al. . |
| 5,377,954 | 1/1995 | Adams et al. . |

OTHER PUBLICATIONS

Brochure by Copes Vulcan entitled High Performance Butterfly Valves, 3 pps.
Brochure by W–K–M Valves entitled High Pressure Butterfly Valve, p. 7.
Brochure by Fisher, Bulletin No. 51.6:8532 (Untitled), pps. 2 and 5.
Brochure by Neles–Jamesbury entitled Neldisc Metal Seated Butterfly Valves, Issue Apr. 1989, pp. 1–2.
Brochure by C&S Valve Company –Industrial Division entitled Tricentric –The Unique Sealing System, 2 pps.
Brochure entitled The Universal Valve 30,000 Series, pps. 1, 3–5.
Brochure (untitled), pps. 2–5.
Brochure entitled Adams Valves, pp. 1–4.
Brochure entitled Dezurik HP Butterfly Valves, Bulletin 45.00–1, May, 1990, pp. 1–24.

*Primary Examiner*—John Fox
*Attorney, Agent, or Firm*—Foley & Lardner

[57] ABSTRACT

A valve including a valve body having a centrally disposed aperture, a rotatable shaft, and a valve disc. The disc has a circumference with an outer edge and is disposed about the shaft such that the disc rotates to an open position and a closed position within the aperture. The valve body further includes a body moment arm about the circumference of the aperture, a body annular recess about the body moment arm and an annular seating ring retainer also about the circumference of the aperture. The seating ring retainer includes a retainer moment arm opposing the body moment arm and a retainer annular recess, a portion of which adjoins the body annular recess. An annular seating ring, also disposed about the circumference of the aperture, has a first end including a tip and a sealing surface adapted to contact the outer edge of the disc when the disc is in the closed position. The seating ring, having a serpentine configuration, is disposed partially between the body moment arm and the retainer moment arm, and partially in a space bounded by the body annular recess and the retainer annular recess. A second end of the seating ring is secured between the seating ring retainer and the body. The seating ring compresses in a radial direction when the disc is in the closed position. Compression of the seating ring causes the tip of the seating ring to move laterally along the retainer moment arm. The retainer moment arm includes a stop to limit the compression of the seating ring.

8 Claims, 6 Drawing Sheets

BI-DIRECTIONAL VALVE SEAL MECHANISM

This application is a continuation-in-part of application Ser. No. 08/634,198, filed Apr. 18, 1996 now abandoned.

The present invention relates to a sealing mechanism used for valves, primarily butterfly valves, which provides tight seals under extreme conditions and which resists leakage when pressure is applied to the valve disc either in the direction of intended fluid flow or in the opposite direction. This sealing mechanism comprises an annular seating ring having a unique surface designed to engage with the convex outer surface of a valve disc, thereby providing a uniquely tight and bidirectional seal.

BACKGROUND OF THE INVENTION

Valves such as butterfly valves are used to control the flow of fluids, e.g., liquids and gases, in a wide variety of industrial applications such as chemical, power, paper, air conditioning, petroleum and refining industries. Moreover, they are designed to handle clean, viscous and corrosive liquids; clean and corrosive gases; and steam. They are also designed for use in high temperature applications. These valves typically comprise a valve body having a central aperture, and a valve disc mounted within the aperture which can be rotated about an axis to shut off the aperture and halt the flow of fluid therethrough. In further refinements, the valves additionally comprise a sealing gasket or member to make the seal more fluid-tight and leak-proof In certain applications, flexible rubber or plastic gaskets have been used. Under more extreme conditions, thin metal sealing members have been used to tighten the seal.

Nevertheless, particularly under high pressure and high temperature, leakage continues to be a considerable problem for such valves. The valves of the prior art have not provided sufficient sealing to reduce leakage to desirable levels. One failing of the prior art has been its use of seating rings which are not restrained from moving a substantial distance laterally and under compression when the valve disc is shut and pressure is applied to the valve disc. This excessive bending of the metal seating ring leaves the seating ring vulnerable to deformation and failure over repeated cycles of pressurization. Such a seating ring is consequently vulnerable to pressure extremes and is especially apt to leak when fluid flows in an opposite direction. Such an arrangement is shown in FIG. 1, which itself comprises a figure from U.S. Pat. No. 4,796,857 to Hayes et al., issued Jan. 10, 1989, incorporated herein by reference (numbers are retained from the original figure, with the addition of a prefix of "1" for clarity). As shown therein, the sealing end 120 of the seating ring is located a substantial distance from any support structure. Accordingly, its seating ring is free to flex to a large degree in both directions laterally, and to be compressed to a great degree. This structure permits substantial disc and seat alignment tolerances, but as discussed above, it does not provide an acceptable seal, particularly under extreme operating conditions.

The present invention discloses a unique seal mechanism which provides improved leak resistance, even under extreme conditions of temperature, pressure, and the like. The sealing member, or seating ring, of the present invention, has an inner surface which is permitted to flex and compress only to a certain degree, a degree based preferably on the movement of the valve door itself under maximum rated pressure load. The seating ring also has a bent or ridged construction which allows a spring-type loading of the seal. This is an aid to sealing, particularly at lower pressures.

Another advantage of the present invention is the location of this sealing surface more centrally on the edge of the valve disc. Other sealing mechanisms have been disposed substantially toward one face or the other of the valve disc. Such a location makes the seal far more vulnerable to slippage, displacement and leakage. The seal of the present invention is located substantially equidistant from the two faces of the valve disc. This ensures maximum protection, and in conjunction with the enhanced deformation resistance of the present invention, provides a seal which is much more impervious to leakage, even under extreme conditions.

Another problem which has not been resolved by the prior art is the integrity of the seal when pressure is applied in a direction opposite that of the intended flow of the fluid. The sealing mechanisms of the prior art do not provide adequate means to resist pressure in this opposite direction, and are particularly vulnerable to leakage when fluid generates pressure in this direction. Nonetheless, under operating conditions, pressure is often generated in this direction due to vacuum creation, process shut-off, system maintenance, etc. Leakage in the reverse direction is particularly undesirable because of the risk of contamination and fouling by down-stream reaction products which may be contained in such leakage.

In addition, the seating ring retainer design disclosed herein can be modified directly to change face to face joinder dimensions. Such a change is required when the valve is used to connect to a variety of pipes of differing diameters, for instance, or when federal or industry safety or utility standards change. This modified seating ring retainer is much less costly and provides more operational flexibility than the prior art, which uses separate, intermediate bodies to change face to face dimensions.

Another limitation of the prior art is the required maintenance of torque forces on the valve disc when the disc is closed to maintain even a marginal seal. The discs typically used in butterfly valves are double-offset, i.e., they sit on shafts which are offset in two spatial directions from the center of the aperture of the valve. Thus, the shaft is disposed, for example, out of the plane of the disc and closer to one side of the disc than to the other. This arrangement theoretically provides some improvement in the seal generated. In use, however, these seals are prone to leaks, and when fluid is forced against the valve disc, torque must be maintained on the disc to keep it shut. This torque is required because the disc is accepting greater force on one side of the shaft than the other, due to the fact that more disc surface area lies on one side of the shaft than the other. This makes a seal difficult to maintain, increases the energy requirements of the seal, and also makes opening and closing the disc more difficult, which can constitute a safety hazard under operating conditions. In addition, the useful life of such a seal is limited by the repeated application of torque to the disc required to make the valve seal.

The present invention resolves this problem by using a single-offset valve disc mount, together with the sealing mechanism disclosed. Thus, the valve disc rotates on a shaft which is offset from the centerpoint of the valve body aperture in one direction only. The shaft is disposed, for example, out of the plane of but equidistant from the sides of the valve disc. Thus, the surface area on one side of the shaft is substantially equal to the area on the other side, so the forces and torques created by fluid pressure on each side are the same. This greatly reduces or eliminates the torque which must be maintained on the disc during use to keep it closed, and contributes to the integrity and durability of the seal. The present invention also positions the shaft as close as possible to the seating ring. This further minimizes the amount of torque required to operate the valve.

SUMMARY OF THE INVENTION

The present invention provides a unique sealing mechanism which employs cooperating seating ring, ring retainer, valve body and valve disc structures to create a seal which resists leakage in both forward and reverse flow directions (i.e., a bi-directional seal). The seating ring is supported in both fluid flow directions by ring retainer and valve body moment arms, which project from recesses in the ring retainer and valve bodies and engage the seating ring. This moment arm construction both supports the body of the seating ring and gives its sealing surface greater elasticity and flexibility within the supported range, which in turn allows a tighter conformational seal with the valve disc.

The present invention teaches a valve including a valve body having a centrally disposed aperture, an annular recess disposed about an outer circumference of the aperture, and a moment arm disposed between the annular recess and the aperture; a rotatable valve shaft; a valve disc with an outer edge disposed about a circumference of the valve disc, the valve disc being disposed about the shaft such that the valve disc rotates via the shaft to an open position and a closed position within the aperture; an annular seating ring having a serpentine configuration, a first end portion and a second end portion, the seating ring being partially disposed within the recess of the valve body, wherein the first end portion has a tip and a sealing surface which is adapted to contact the outer edge of the valve body when the valve disc is in the closed position within the aperture; and an annular seating ring retainer comprising an annular recess disposed about the outer circumference of the aperture such that at least a portion thereof adjoins the annular recess of the valve body, and a moment arm disposed between the annular recess of the retainer and the aperture, wherein the second end portion of the seating ring is securely disposed between the valve body and the retainer; wherein the seating ring is compressible in a radial direction when the valve disc is in the closed position and subjected to a full rated fluid pressure for the valve, and the compression of the seating ring causes the tip of the first end of the seating ring to move towards the seating ring retainer a first distance, and wherein the moment arm of the seating ring retainer includes a stop adjacent the tip of the first end of the seating ring and located a second distance from the tip when the valve disc is in the open position, the second distance being substantially equal to the first distance to allow sufficient compression of the seating ring to effect a strong seal without permitting excessive, deforming compression; wherein the moment arm of the valve body is directly adjacent to or in contact with a convex surface of a bend of the seating ring nearest the sealing surface; and wherein the moment arm of the seating ring retainer is located within and is adapted to engage a concave surface of the bend of the seating ring.

The present invention also discloses a valve having an angled contact point between the tip and the sealing surface of the seating ring, wherein the angled contact point is adapted to engage a top surface of the moment arm of the seating ring retainer and to thus limit compression of the seating ring.

Other objects and advantages of the present invention will be obvious to one skilled in the art in light of the drawings and description which follow.

DESCRIPTION OF THE PREFERRED EMBODIMENTS

Figure 1:
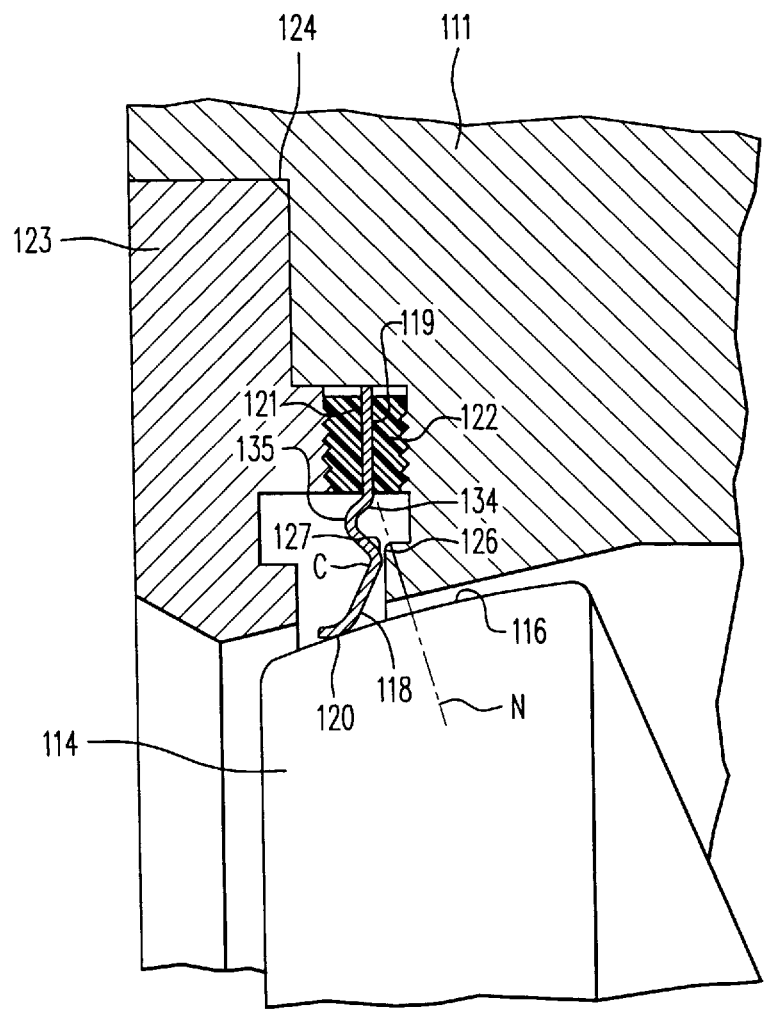
FIG. 1 is a side cutaway view of a valve sealing mechanism of the prior art.
Figure 2:
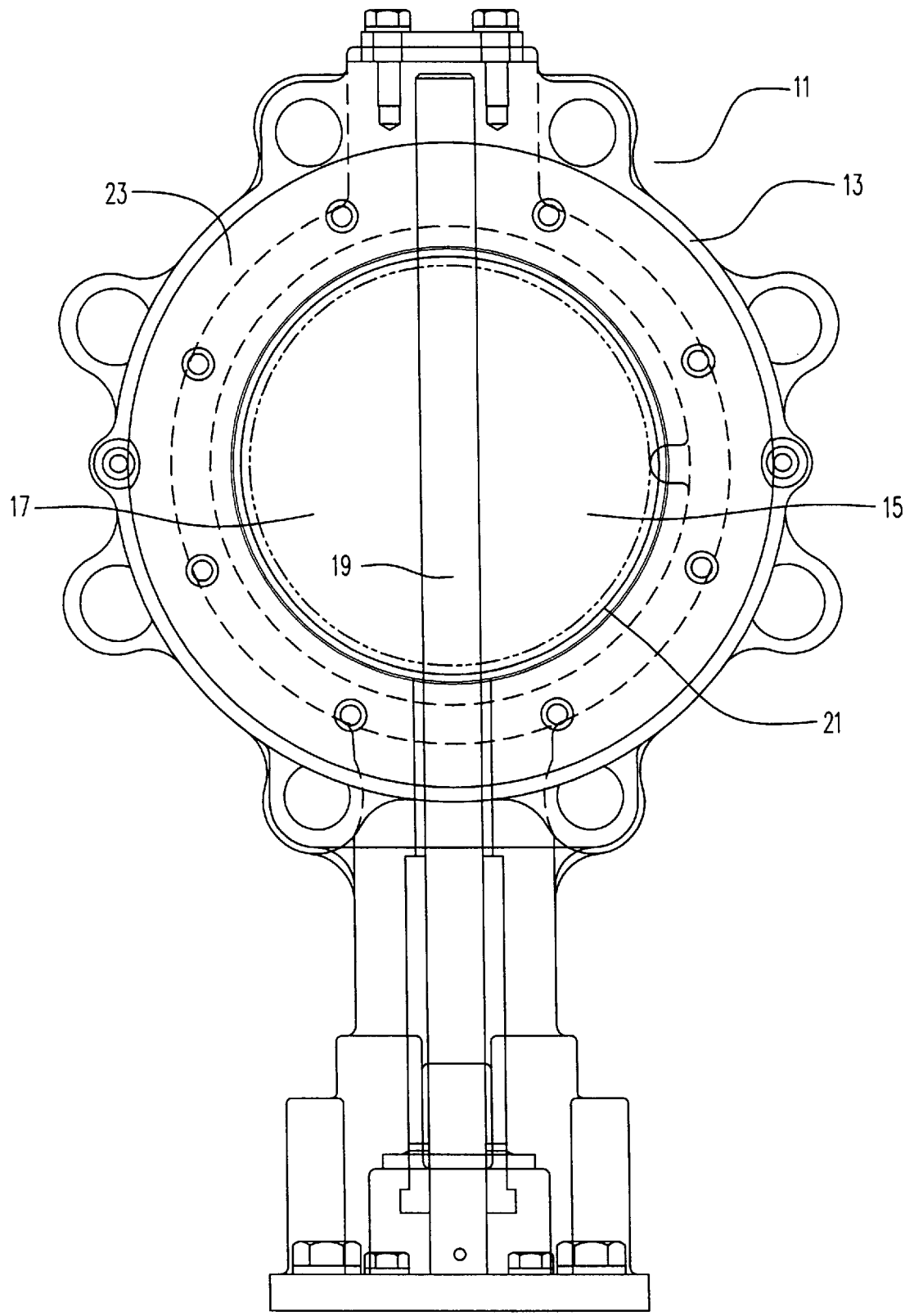
FIG. 2 is a front perspective view of a preferred butterfly valve of the present invention.
Figure 3:
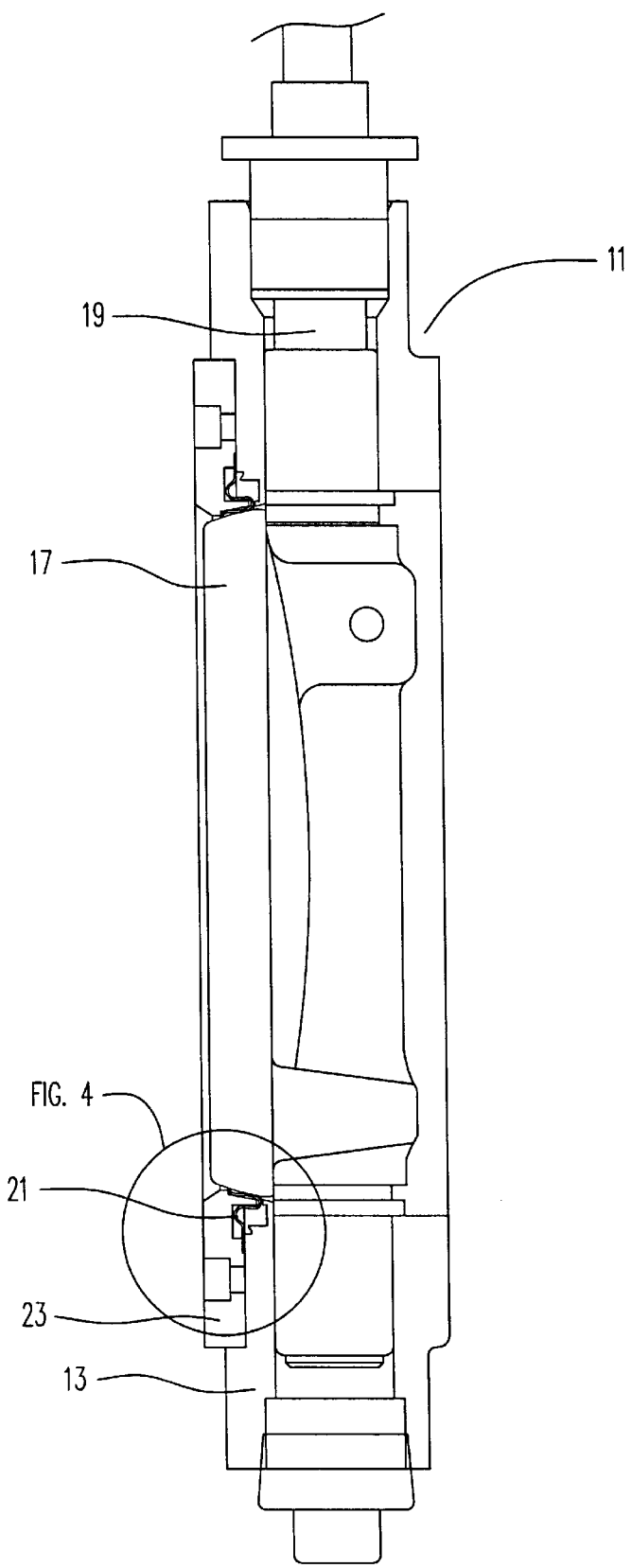
FIG. 3 is a side perspective view of a preferred butterfly valve of the present invention.
Figure 6:
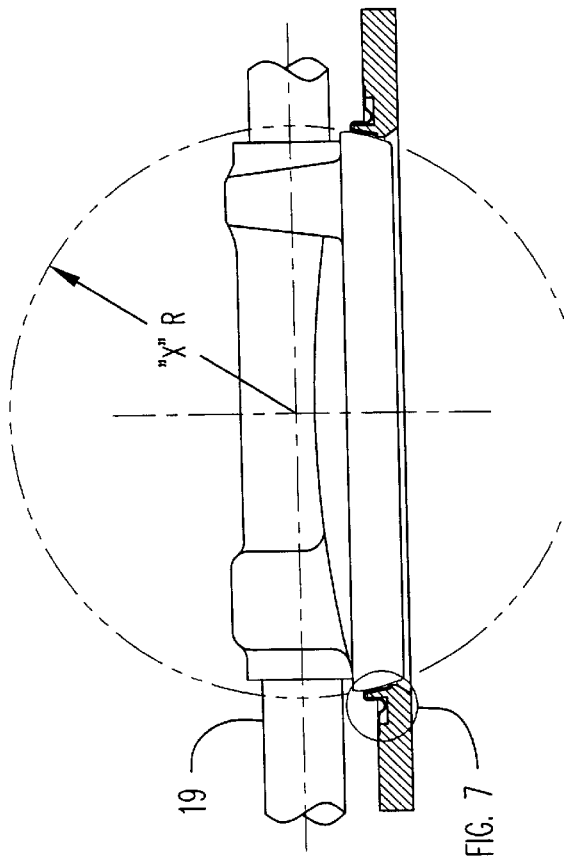
FIG. 6 is a side perspective view of the valve of FIG. 5.
Figure 7:
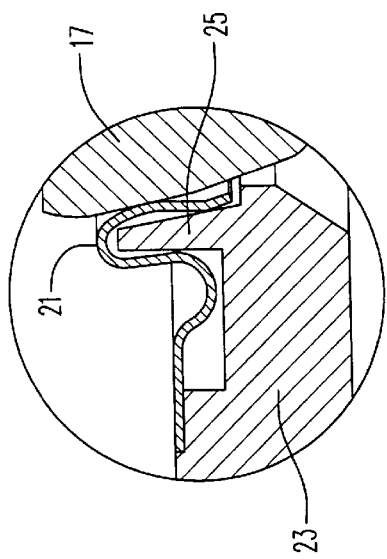
FIG. 7 is a cross-sectional, enlarged view of area "B" of FIG. 6.
Figure 5:
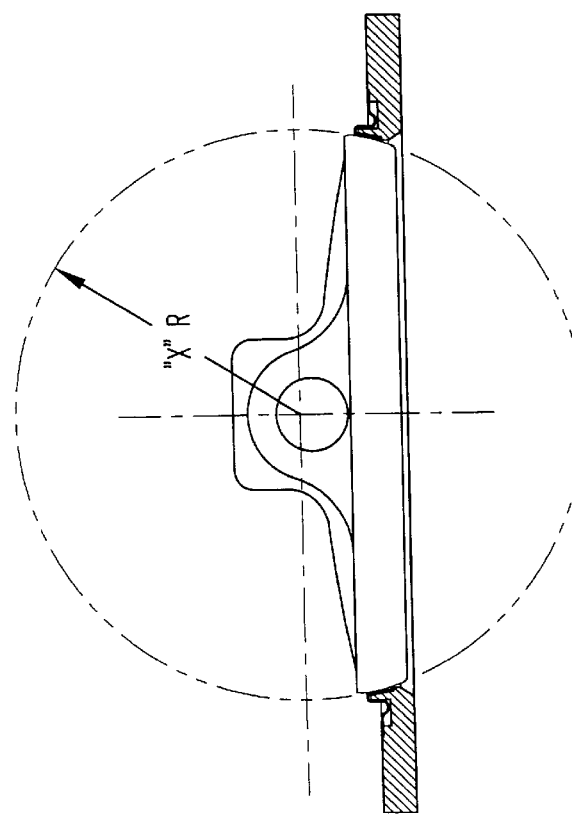
FIG. 5 is a top perspective view of the valve of a preferred embodiment of the present invention.

As can be seen with reference to FIGS. 2 and 3, the preferred embodiment butterfly valve 11 comprises a valve body 13 having a central tubular aperture 15 through which gas or liquid fluids may pass. Valve disc 17, which has a spherical shape, is mounted on shaft 19 so that it sits at least partially in aperture 15. The valve disc 17 is not a sphere; the term "spherical" is used in the valve art to describe a disc 17 which is a section or slice of a sphere. Thus, its outer edges define a sphere in space. This can best be seen with reference to FIGS. 5–7. As seen in FIGS. 5 and 6, the centerline of the sphere is located at the center of the shaft and the center of the valve disc from top to bottom, and the radius R of the sphere is the radius of the sphere and the radius of the sealing surface (note that FIGS. 5–7 do not depict the valve body). Typically, then, the circumference of one circular face will be greater than the circumference of its other circular face. This construction provides for a tighter seal, particularly when combined with the seating ring 21 of the present invention. Valve disc 17 rotates about the axis of shaft 19. When aligned with aperture 15, it is in a closed position. When ajar, it is open and fluids are free to pass.

Seating ring 21 is formed, in this preferred embodiment, and mounted about the edge of the aperture 15 and has a first, inner end, a second, outer end, and a serpentine, bent section in proximity to the first end. The second end is immobilized against valve body 13 by the annular seating ring retainer 23. Seating ring retainer 23 is removably affixed to valve body 13 to secure the seating ring 21. This arrangement allows seating ring 21 to be replaced easily when necessary due to wear or changed seal requirements. The effective seal of the present invention is due in part to the unique configuration of the first end of seating ring 21.

Figure 4:
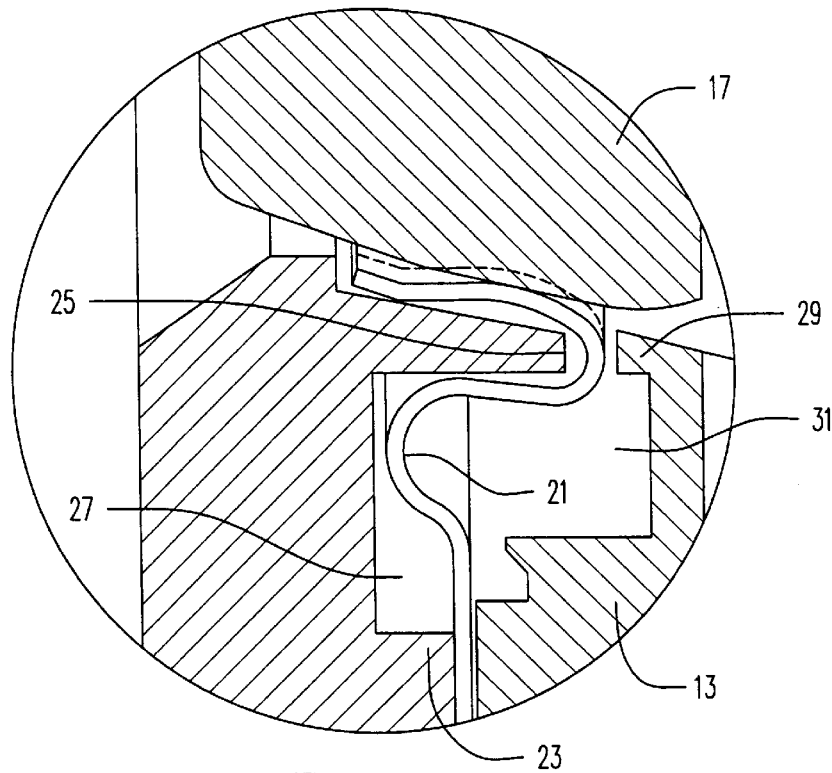
FIG. 4 is a cross-sectional, enlarged view of area "A" of FIG. 3 according to one embodiment of the present invention.
Figure 4A:
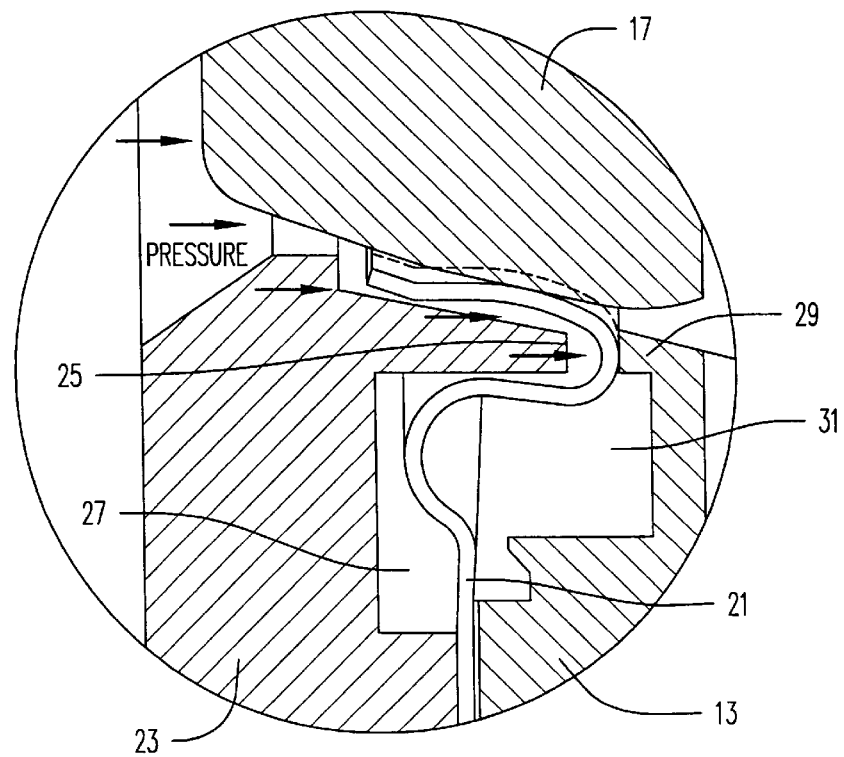
FIGS. 4A and 4B depict the seat of FIG. 4 under forward and reverse pressure.

Appropriate space is provided between the tip of seating ring 21 and the edge of seating ring retainer 23 to allow the seat to move just enough with the disc and with pressure to allow effective sealing, but prevent seat deformation and maintain low operating torques. The dotted lines in FIG. 4 show the position of seating ring 21 when valve disc 17 is open. When valve disc 17 is closed, it presses against and spring loads seating ring 21 to the position shown in solid lines in FIG. 4. The upper face of moment arm 25 prevents further deflection of seating ring 21, once the angled contact point preferably located between the tip and the sealing surface of the seating ring contacts the moment arm 25 to prevent deformation of the seating ring 21. Similarly, as full rated pressure is applied to valve disc 17, valve disc 17 and seating ring 21 are urged to the left, as depicted in FIG. 4A. Once again, the tip of seating ring 21 contacts the adjacent surface of seating ring retainer 23, preferably when the degree of deflection caused by a fill rated pressure on valve disc 17 is achieved. This contact between the tip of seating ring 21 and seating ring retainer 23 prevents seating ring 21 from deflecting excessively. Thus, seating ring retainer 23 acts as a stop to seating ring 21 in horizontal and vertical directions, thus limiting the maximum deflection and compression allowed, and minimizing the likelihood of permanent seating ring deformation and failure.

A preferred seating ring of the present invention, as depicted in FIG. 4, has a serpentine conformation including a first, free end; an angled contact point adjacent the free end; a convex sealing surface adjacent the angled contact point; a hairpin curve adjacent the convex sealing surface; and a second, mounting end. This seating ring preferably also includes a second curve adjacent and in an orientation opposite to the hairpin curve, the second curve extending back under the convex sealing surface to an extent approximately in alignment with the angled contact point. The hairpin curve of this preferred seating ring is adapted to accept the elongated moment arm of the seating ring with minimal clearance.

For example, in a preferred disc having a fill rated pressure of 285 psi, lateral disc movement at that pressure was determined to be 0.019 inches. Therefore, it seating ring 21 and seating ring retainer 23 are preferably designed to provide about 0.019 inches horizontally (as in FIG. 4) from the edge of seating ring retainer 23 to the tip of seating ring 21. For this same disc, 0.017 inches was determined to be the optimal interference between the relaxed height of seating ring 21 at its sealing surface and the compressed height of seating ring 21 at the same location when the valve disc is subjected to full rated pressure. Accordingly, it is preferred that there be about 0.017 inches between the bottom of the tip of seating ring 21 and the top of moment arm 25. Similarly, it is preferred that the interference between seating ring 21 and seating ring retainer 23, namely the shortest distance between the top of moment arm 25 and the inside of seating ring 21 under the sealing surface, be about 0.017 inches. This configuration ensures that the seating ring is allowed to move radially no more than about 0.017 inches under full rated pressure. These preferred dimensions depend on the size of the parts involved and on the mechanical property of the materials used to fabricate the component parts. For example, the smaller the seating ring used, the less the preferred interference will be.

In addition, spherical geometry makes the seal less position-sensitive because the seat can seal at any range of points where it is in contact with the sphere defined by the mating part.

As can be seen with reference to FIG. 4, seating ring retainer 23 has moment arm 25 at its innermost edge. Immediately interior to the moment arm 25 is recess 27. Recess 27 can be defined by two or three planar surfaces. The valve body 13 has a structure analogous to that of the seating ring retainer 23. Moment arm 29 sits at the innermost edge of valve body 13. Immediately interior to the moment arm 29 is recess 31.

When seating ring retainer 23 is adjoined to valve body 13, corresponding recesses 27 and 31 create an annular space which accepts part of the seating ring 21. In the preferred embodiment of FIG. 4, the second end of the seating ring 21 is compressed and immobilized between the abutting faces of valve body 13 and seating ring retainer 23. One or more gaskets may also be placed between the seating ring and the valve body or between the seating ring and the seating ring retainer.

With reference to FIG. 4, as discussed above, it can be seen that valve body moment arm 29 performs a stabilizing and seal-strengthening function as well. It is allowed to contact the convex surface of the innermost bend of seating ring 21 to limit the lateral movement of the first, sealing end of the seating ring, particularly when it is subject to force in the direction of the valve body. This preserves seal integrity when fluid flows in the normal, anticipated direction. It allows the seat to move just enough to create the most effective seal, without moving too much and causing permanent deformation of the seat.

Figure 4B:
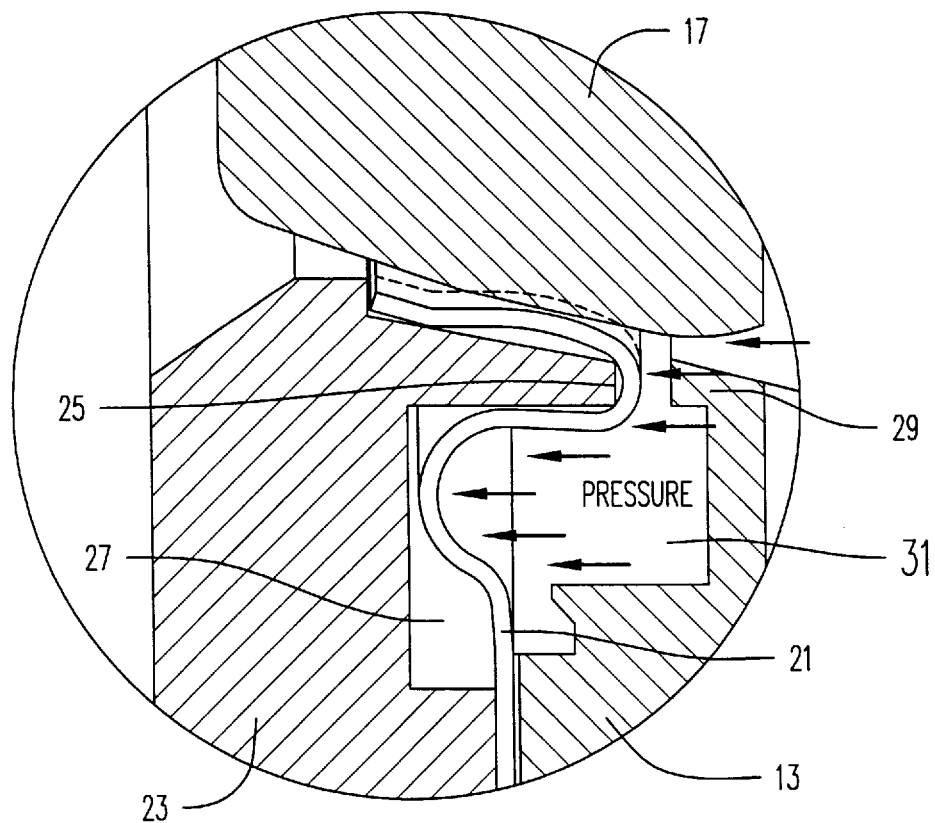

As explained above, seating ring retainer moment arm 25 provides a stabilizing force in the opposite direction. Moment arm 25 extends into and engages the convex surface of the innermost bend of seating ring 21. As shown in FIG. 4A, this insures tight sealing when valve disc 17 is closed, because the first, sealing end of seating ring 21 is allowed to move only the same distance as there is interference built in between the seat 21 and disc 17. This allows for the best match between the seat and disc under varying pressure conditions without causing permanent deformation to the seat. Moment arm 25 also functions, as its name suggests, as a moment arm about which the first end of the seating ring 21 can flex. This allows the upper end of seating ring 21 to conform even more perfectly to the contours of the valve disc. Moment arm 25 provides an additional benefit, as well. As shown in FIG. 4B, when fluid flow is reversed, and begins to travel in a direction opposite its normal flow, moment arm 25 insures that the seal remains tight by allowing the seat to move laterally the same distance that the disc 17 moves by the pressure, therefore maintaining the most effective seal and not deforming the seat 21 while keeping operating torque low. This structure, in combination with moment arm 29 discussed above, provides the unique bi-directional seal of the present invention.

Positive shut off of the valve is accomplished by using a pressure balanced single offset spherical design. The seat is mechanically energized equal interference between the seat and disc. This means that the operating torque is significantly lower than double offset designs. The valve of the present invention does not require additional torque to effect a seal. When the valve is in the closed position it has about 3 to 5 degrees of travel that can occur and still seal. In contrast, some prior art designs rely on deformation of the metal sealing members as the disc is forced into the seat to obtain the seal, thus making them extremely position sensitive. These valves are either closed and sealing or they are not—there is no forgiveness. Accordingly, these seats are called "torque actuated" seats which means that the only way to get the valve to seal better is to apply more torque from the actuator.

The preferred seat of the present invention is manufactured to extremely close tolerances. It is allowed to move with increased pressure, preventing any permanent deformation of the sealing members and keeping the torque about 50 to 75% lower than other available products. Lower torque means less interference between the sealing members, which in turn means less wear and longer life.

The preferred seat of the present invention incorporates an independent static seal between the valve and the valve body, seat and seat retainer. In contrast, some prior art seats use the seat for this purpose, thereby eliminating a part but introducing an unreliable dynamic seal. If any corrosion or pitting occurs on the body or the seat retainer in this area, the seal fails, resulting in leakage around the seat. This would be of particular concern with carbon steel materials of construction or in applications where stainless steel is prone to pitting due to corrosion precipitation.

The preferred valve of the present invention has a fully supported one piece shaft with substantial one piece nickel bearings. The shaft is preferably retained with a tangential locking pin for a tight, no lost motion, disc/shaft connection. This pin is mechanically retained for easy disassembly. The preferred valve is easily repairable. In the unlikely event that a seat, disc or bearing needs to be replaced, the valve is easily disassembled. There are preferably no welds to remove or pins to drill out to disassemble the valve. All that is required is to remove the screws fastening the retainer to the body and the screw that locks the disc/shaft pin into place. Representative seats of the present invention have been tested at full rated pressure dry to 3,000 cycles maintaining Class VI shut off. These seats have been cycled 20,000 cycles at full rated pressure wet with essentially no degradation in sealing performance.

The invention having been thus described with particular reference to the preferred forms thereof, it will be obvious that various changes and modifications may be made therein without departing from the spirit and scope of the invention as defined in the appended claims.

What is claimed is:

1. In a valve comprising:
   (a) a valve body having a centrally disposed aperture, an annular recess disposed about an outer circumference of said aperture, and a moment arm disposed between said annular recess and said aperture;
   (b) a rotatable valve shaft;
   (c) a valve disc with an outer edge disposed about a circumference of said valve disc, said valve disc being disposed about said shaft such that said valve disc rotates via said shaft to an open position and a closed position within said aperture;
   (d) an annular seating ring having a serpentine configuration, a first end portion and a second end portion, said seating ring being partially disposed within said recess of said valve body, wherein said first end portion has a tip and a sealing surface which is adapted to contact said outer edge of said valve body when said valve disc is in said closed position within said aperture; and
   (e) an annular seating ring retainer comprising an annular recess disposed about said outer circumference of said aperture such that at least a portion thereof adjoins said annular recess of said valve body, and a moment arm disposed between said annular recess of said retainer and said aperture, wherein said second end portion of said seating ring is securely disposed between said valve body and said retainer;

the improvement wherein said seating ring is compressible in a radial direction when said valve disc is in said closed position and subjected to a full rated fluid pressure for said valve, and said compression of said seating ring causes said tip of said first end of said seating ring to move towards said seating ring retainer a first distance, and
   wherein said moment arm of said seating ring retainer includes a stop adjacent said tip of said first end of said seating ring and located a second distance from said tip when said valve disc is in said open position,
   said second distance being substantially equal to said first distance to allow sufficient compression of said seating ring to effect a strong seal without permitting excessive, deforming compression;
   wherein said moment arm of said valve body is directly adjacent to or in contact with a convex surface of a bend of said seating ring nearest said sealing surface; and
   wherein said moment arm of said seating ring retainer is located within and is adapted to engage a concave surface of said bend of said seating ring.

2. The valve of claim 1, further comprising an angled contact point between said tip and said sealing surface of said seating ring, wherein said angled contact point is adapted to engage a top surface of said moment arm of said seating ring retainer and to thus limit compression of said seating ring.

3. The valve of claim 1, wherein said sealing surface is situated centrally on said outer edge of said valve disc when said valve disc is in said closed position.

4. The valve of claim 1, further comprising a single-offset valve disc mount.

5. The valve of claim 1, wherein said valve disc is spherical.

6. The valve of claim 1, wherein said tip of said seating ring and said seating ring retainer are separated by about 0.019 inches when said valve disc is in said closed position and before application of fluid pressure to said valve disc.

7. The valve of claim 1, wherein an interference between said seating ring at said sealing surface and a top of said moment arm is about 0.017 inches when said valve disc is in said closed position and before application of fluid pressure to said valve disc.

8. The valve of claim 7 wherein said seating ring can form a seal against said valve disc and travel about 3 to about 5 degrees without losing said seal.

* * * * *